(12) United States Patent
Allgeier et al.

(10) Patent No.: US 11,849,681 B1
(45) Date of Patent: Dec. 26, 2023

(54) MULTI-NOZZLE MISTING SYSTEM FOR AN INDOOR GARDENING APPLIANCE

(71) Applicant: Haier US Appliance Solutions, Inc., Wilmington, DE (US)

(72) Inventors: Brian Allgeier, Louisville, KY (US); Louis A. Wantland, Louisville, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 0 days.

(21) Appl. No.: 17/861,592

(22) Filed: Jul. 11, 2022

(51) Int. Cl.
*A01G 29/00* (2006.01)
*A01G 27/00* (2006.01)
*A01G 9/02* (2018.01)

(52) U.S. Cl.
CPC .............. *A01G 29/00* (2013.01); *A01G 9/023* (2013.01); *A01G 27/001* (2013.01); *A01G 27/008* (2013.01)

(58) Field of Classification Search
CPC ...... A01G 29/00; A01G 9/023; A01G 27/001; A01G 27/008; A01G 27/003; A01G 9/249; A01G 9/247; A01G 9/022
See application file for complete search history.

(56) References Cited

U.S. PATENT DOCUMENTS

| 8,904,705 | B2 | 12/2014 | Downs, Sr. |
| 9,516,822 | B2 | 12/2016 | Gonyer et al. |
| 2005/0252080 | A1 | 11/2005 | Wright |
| 2012/0005957 | A1 | 1/2012 | Downs |
| 2013/0061521 | A1* | 3/2013 | Cudmore .............. C05F 17/964 47/83 |
| 2013/0145690 | A1* | 6/2013 | Cannon ................... A01G 9/023 47/66.7 |
| 2018/0042186 | A1 | 2/2018 | Kop |
| 2019/0124865 | A1* | 5/2019 | Sunnen ..................... A01G 7/02 |
| 2020/0037514 | A1* | 2/2020 | Massey ..................... A01G 9/24 |
| 2020/0170205 | A1* | 6/2020 | Zamir .................. A01G 27/001 |
| 2020/0236864 | A1* | 7/2020 | Henry .................. A01G 27/003 |
| 2021/0084844 | A1 | 3/2021 | Hunter et al. |
| 2021/0176935 | A1* | 6/2021 | Massey ..................... A01G 9/26 |
| 2021/0352852 | A1* | 11/2021 | Adams ..................... A01G 9/26 |

(Continued)

FOREIGN PATENT DOCUMENTS

| CN | 101940155 A | 1/2011 |
| CN | 106134975 A | 11/2016 |

(Continued)

*Primary Examiner* — Monica L Perry
*Assistant Examiner* — Aaron M Rodziwicz
(74) *Attorney, Agent, or Firm* — Dority & Manning, P.A.

(57) ABSTRACT

An indoor gardening appliance includes a liner defining a grow chamber and a grow tower mounted within the grow chamber for receiving a plurality of plant pods. A hydration assembly is positioned within a root chamber and includes a nozzle support frame mounted at a top of the root chamber, the nozzle support frame comprising a plurality of support arms, at least one of the plurality of support arms being off-axis relative to the central axis of the grow tower, an upper nozzle mounted to the nozzle support frame proximate a top of the root chamber, a lower nozzle mounted to the nozzle support frame proximate a bottom of the root chamber, and a water supply for supplying a flow of fluid to at least one of the upper nozzle or the lower nozzle.

20 Claims, 10 Drawing Sheets

(56) References Cited

U.S. PATENT DOCUMENTS

2022/0007599 A1 * 1/2022 Lim .................. A01G 9/247
2022/0225579 A1 * 7/2022 Robell ................ H05B 47/11

FOREIGN PATENT DOCUMENTS

| CN | 214178485 U | 9/2021 | | |
|----|-------------|--------|---|---|
| CN | 214508648 U | 10/2021 | | |
| WO | WO-2009010773 A1 * | 1/2009 | ............ | A01G 9/023 |
| WO | WO-2020142851 A1 * | 7/2020 | ............ | A01G 31/02 |
| WO | WO-2021080139 A1 * | 4/2021 | ............ | A01G 24/00 |

* cited by examiner

MULTI-NOZZLE MISTING SYSTEM FOR AN INDOOR GARDENING APPLIANCE

FIELD OF THE INVENTION

The present subject matter relates generally to systems for gardening plants indoors, and more particularly, to systems and methods for hydrating plants within an indoor gardening appliance.

BACKGROUND OF THE INVENTION

Conventional indoor garden centers include a cabinet defining a grow chamber having a number of trays or racks positioned therein to support seedlings or plant material, e.g., for growing herbs, vegetables, or other plants in an indoor environment. In addition, such indoor garden centers may include an environmental control system that maintains the growing chamber at a desired temperature or humidity. Certain indoor garden centers may also include hydration systems for watering the plants and/or artificial lighting systems that provide the light necessary for such plants to grow.

Conventional indoor gardens centers typically include a hydration system for providing a flow of water and nutrients onto plants stored therein to facilitate plant growth. For example, typical garden centers have a nozzle that sprays water onto roots within a root chamber of a grow module or otherwise charges the entire root chamber with a mist. Such hydration systems typically include a single nozzle positioned proximate a top of the root chamber for charging the entire root chamber with mist. Certain hydration systems also include a lower nozzle that is suspended by a supply conduit proximate a bottom of the root chamber. However, root growth can frequently entangle the lower nozzle and/or the supply conduit, thereby blocking flow ports or moving the lower nozzle away from the desired position, Moreover, moving the plants grown within the tray or moving the rack itself may also pull the lower nozzle and supply conduit out of position or pull the plants out of the rack.

Accordingly, an improved indoor garden center would be useful. More particularly, an indoor garden center with a hydration system that facilitates complete and uniform hydration within the root chamber would be particularly beneficial.

BRIEF DESCRIPTION OF THE INVENTION

Aspects and advantages of the invention will be set forth in part in the following description, or may be apparent from the description, or may be learned through practice of the invention.

In one exemplary embodiment, a gardening appliance defining a vertical direction is provided. The gardening appliance includes a liner positioned within a cabinet and defining a grow chamber, a grow tower rotatably mounted within the liner about a central axis, the grow tower defining a root chamber, a plurality of apertures defined through the grow tower, the plurality of apertures being configured for receiving a plurality of plant pods that grow a plurality of plants, a hydration system for hydrating the plurality of plants. The hydration system includes a nozzle support frame mounted at a top of the root chamber, the nozzle support frame comprising a plurality of support arms, at least one of the plurality of support arms being off-axis relative to the central axis of the grow tower, an upper nozzle mounted to the nozzle support frame proximate a top of the root chamber, a lower nozzle mounted to the nozzle support frame proximate a bottom of the root chamber, and a water supply for supplying a flow of fluid to at least one of the upper nozzle or the lower nozzle.

In another exemplary embodiment, a hydration system for a gardening appliance is provided. The gardening appliance includes a grow tower rotatably mounted within a liner and defining a root chamber. The hydration system includes a nozzle support frame mounted at a top of the root chamber, the nozzle support frame comprising a plurality of support arms, at least one of the plurality of support arms being off-axis relative to a central axis of the grow tower, an upper nozzle mounted to the nozzle support frame proximate a top of the root chamber, a lower nozzle mounted to the nozzle support frame proximate a bottom of the root chamber, and a water supply for supplying a flow of fluid to at least one of the upper nozzle or the lower nozzle.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

Figure 1:
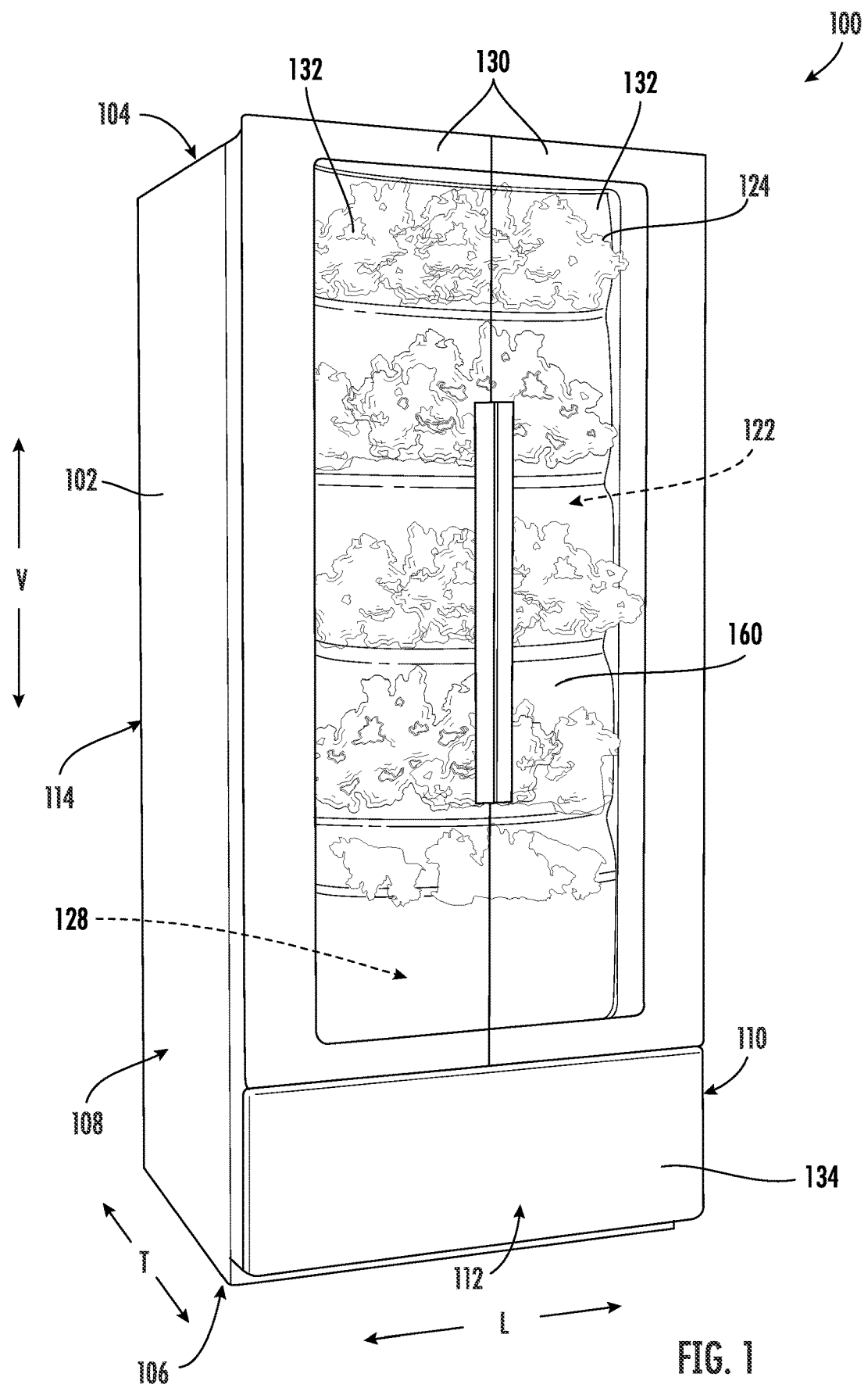
FIG. 1 provides a perspective view of a gardening appliance according to an exemplary embodiment of the present subject matter.

Repeat use of reference characters in the present specification and drawings is intended to represent the same or analogous features or elements of the present invention.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first," "second," and "third" may be used interchangeably to distinguish one component from another and are not intended to signify location or importance of the individual components. The terms "includes" and "including" are intended to be inclusive in a manner similar to the term "comprising." Similarly, the term "or" is generally intended to be inclusive (i.e., "A or B" is intended to mean "A or B or both"). In addition, here and throughout the specification and claims, range limitations may be combined and/or interchanged. Such ranges are identified and include all the sub-ranges contained therein unless context or language indicates otherwise. For example, all ranges disclosed herein are inclusive of the endpoints, and the endpoints are independently combinable with each other. The singular forms "a," "an," and "the" include plural references unless the context clearly dictates otherwise.

Approximating language, as used herein throughout the specification and claims, may be applied to modify any quantitative representation that could permissibly vary without resulting in a change in the basic function to which it is related. Accordingly, a value modified by a term or terms, such as "generally," "about," "approximately," and "substantially," are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 10 percent margin, i.e., including values within ten percent greater or less than the stated value. In this regard, for example, when used in the context of an angle or direction, such terms include within ten degrees greater or less than the stated angle or direction, e.g., "generally vertical" includes forming an angle of up to ten degrees in any direction, e.g., clockwise or counterclockwise, with the vertical direction V.

The word "exemplary" is used herein to mean "serving as an example, instance, or illustration." In addition, references to "an embodiment" or "one embodiment" does not necessarily refer to the same embodiment, although it may. Any implementation described herein as "exemplary" or "an embodiment" is not necessarily to be construed as preferred or advantageous over other implementations. Moreover, each example is provided by way of explanation of the invention, not limitation of the invention. In fact, it will be apparent to those skilled in the art that various modifications and variations can be made in the present invention without departing from the scope of the invention. For instance, features illustrated or described as part of one embodiment can be used with another embodiment to yield a still further embodiment. Thus, it is intended that the present invention covers such modifications and variations as come within the scope of the appended claims and their equivalents.

Referring now to the figures, a gardening appliance 100 will be described in accordance with exemplary aspects of the present subject matter. According to exemplary embodiments, gardening appliance 100 may be used as an indoor garden center for growing plants. It should be appreciated that the embodiments described herein are intended only for explaining aspects of the present subject matter. Variations and modifications may be made to gardening appliance 100 while remaining within the scope of the present subject matter.

According to exemplary embodiments, gardening appliance 100 includes a cabinet 102 that is generally configured for containing and/or supporting various components of gardening appliance 100 and which may also define one or more internal chambers or compartments of gardening appliance 100. In this regard, as used herein, the terms "cabinet," "housing," and the like are generally intended to refer to an outer frame or support structure for gardening appliance 100, e.g., including any suitable number, type, and configuration of support structures formed from any suitable materials, such as a system of elongated support members, a plurality of interconnected panels, or some combination thereof. It should be appreciated that cabinet 102 does not necessarily require an enclosure and may simply include open structure supporting various elements of gardening appliance 100. By contrast, cabinet 102 may enclose some or all portions of an interior of cabinet 102. It should be appreciated that cabinet 102 may have any suitable size, shape, and configuration while remaining within the scope of the present subject matter.

As illustrated, gardening appliance 100 generally defines a vertical direction V, a lateral direction L, and a transverse direction T, each of which is mutually perpendicular, such that an orthogonal coordinate system is generally defined. The horizontal direction is generally intended to refer to a direction perpendicular to the vertical direction V (e.g., within a plane defined by the lateral direction L and the transverse direction T). Cabinet 102 generally extends between a top 104 and a bottom 106 along the vertical direction V, between a first side 108 (e.g., the left side when viewed from the front as in FIG. 1) and a second side 110 (e.g., the right side when viewed from the front as in FIG. 1) along the lateral direction L, and between a front 112 and a rear 114 along the transverse direction T. In general, terms such as "left," "right," "front," "rear," "top," or "bottom" are used with reference to the perspective of a user accessing gardening appliance 100.

Gardening appliance 100 may include an insulated liner 120 positioned within cabinet 102. Liner 120 may at least partially define an internal temperature-controlled chamber, referred to herein generally as a climate-controlled chamber 122, within which plants 124 may be grown. Although gardening appliance 100 is referred to herein as growing plants 124, it should be appreciated that other organisms or living things may be grown or stored in gardening appliance 100. For example, algae, fungi (e.g., including mushrooms), or other living organisms may be grown or stored in gardening appliance 100. The specific application described herein is not intended to limit the scope of the present subject matter in any manner.

Cabinet 102, or more specifically, liner 120 may define a substantially enclosed back portion 126 (e.g., proximate rear 114 of cabinet 102). In addition, cabinet 102 and liner 120 may define a front opening, referred to herein as front display opening 128 (e.g., proximate front 112 of cabinet 102), through which a user of gardening appliance 100 may access climate-controlled chamber 122, e.g., for harvesting, planting, pruning, or otherwise interacting with plants 124. According to an exemplary embodiment, enclosed back portion 126 may be defined as a portion of liner 120 that defines climate-controlled chamber 122 proximate rear side 114 of cabinet 102. In addition, front display opening 128 may generally be positioned proximate or coincide with front side 112 of cabinet 102.

Figure 2:
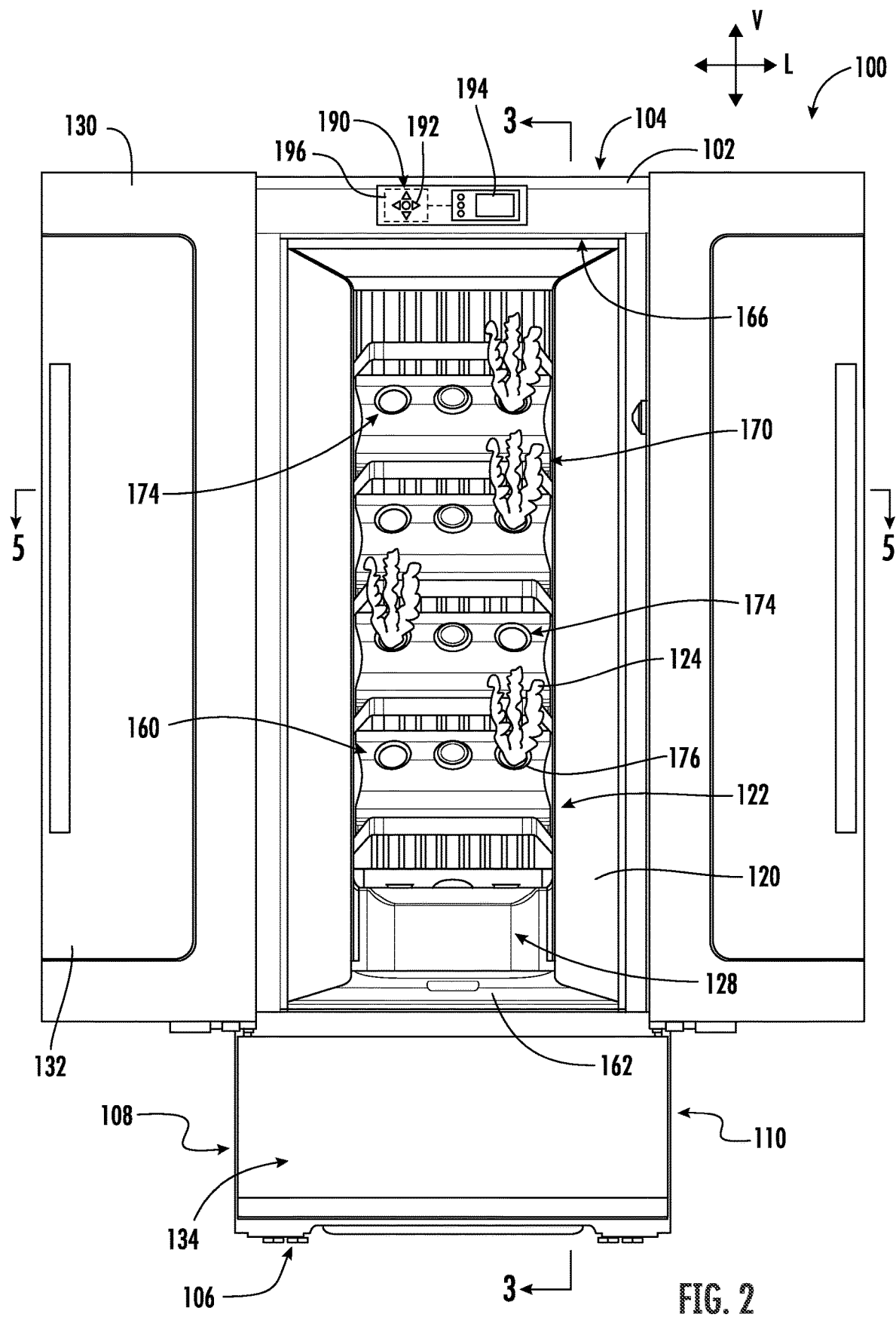
FIG. 2 depicts a front view of the exemplary gardening appliance of FIG. 1 with the doors open according to an exemplary embodiment of the present subject matter.

Gardening appliance 100 may further include one or more doors 130 that are rotatably mounted to cabinet 102 for providing selective access to climate-controlled chamber 122. For example, FIG. 1 illustrates doors 130 in the closed position such that they may help insulate climate-controlled chamber 122. By contrast, FIG. 2 illustrates doors 130 in the open positioned to permit access to climate-controlled chamber 122 and plants 124 stored therein. Doors 130 may further include a transparent window 132 through which a user may observe plants 124 without opening doors 130.

Although doors 130 are illustrated as being rectangular and being mounted on front side 112 of cabinet 102 in FIGS. 1 and 2, it should be appreciated that according to alternative embodiments, doors 130 may have different shapes, mounting locations, etc. For example, doors 130 may be curved, may be formed entirely from glass, etc. In addition, doors 130 may have integral features for controlling light passing into and/or out of climate-controlled chamber 122, such as internal louvers, tinting, UV treatments, polarization, etc. One skilled in the art will appreciate that other chamber and door configurations are possible and within the scope of the present subject matter.

According to the illustrated embodiment, cabinet 102 further defines a drawer 134 positioned proximate bottom 106 of cabinet 102 and being slidably mounted to cabinet 102 for providing convenient storage for plant nutrients, system accessories, water filters, etc. In addition, behind drawer 134 is a mechanical compartment 136 for receipt of an environmental control system including a sealed system for regulating the temperature within climate-controlled chamber 122, as described in more detail below.

Figure 3:
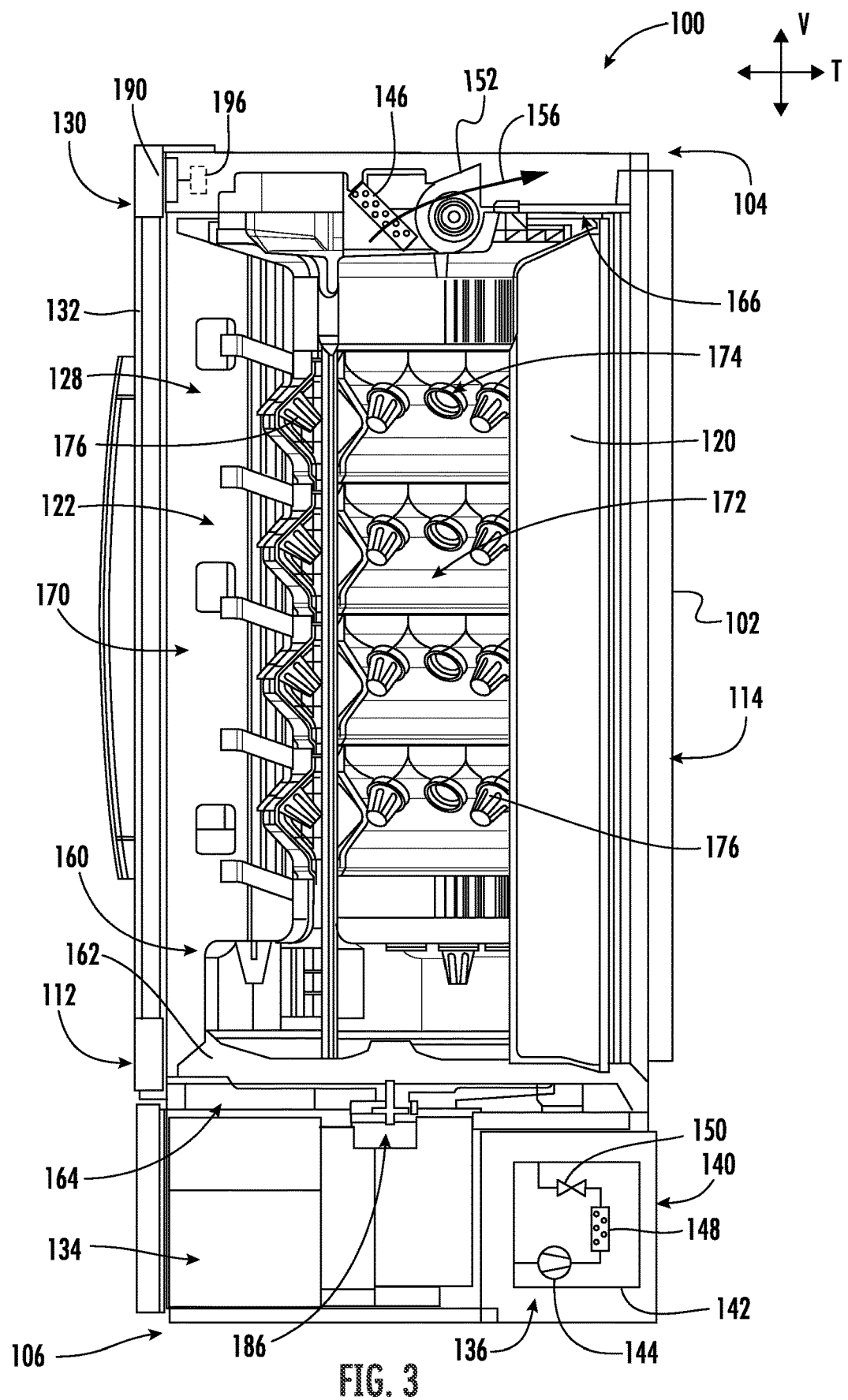
FIG. 3 is a cross sectional view of the exemplary gardening appliance of FIG. 1, taken along Line 3-3 from FIG. 2.

FIG. 3 provides a schematic view of certain components of an environmental control system 140 that may be used to regulate a climate or environment within climate-controlled chamber 122. Specifically, environmental control system 140 may include one or more subsystems for regulating temperature, humidity, hydration, nutrient dosing, lighting, and any other aspects of the environment within one or more portions of climate-controlled chamber 122, e.g., as desired to facilitate improved or regulated growth of plants 124 positioned therein. Although exemplary subsystems and subsystem configurations are described below, it should be appreciated that aspects of environmental control system 140 may vary while remaining within the scope of the present subject matter.

As illustrated, environmental control system 140 includes a sealed system 142 that is generally configured for regulating a temperature and/or humidity within one or more regions of climate-controlled chamber 122. In this regard, as shown schematically in FIG. 3, sealed system 142 may be located partially within mechanical compartment 136 and includes a compressor 144, a first heat exchanger or evaporator 146 and a second heat exchanger or condenser 148. As is generally understood, compressor 144 is generally operable to circulate or urge a flow of refrigerant through sealed system 142, which may include various conduits which may be utilized to flow refrigerant between the various components of sealed system 142. Thus, evaporator 146 and condenser 148 may be between and in fluid communication with each other and compressor 144.

During operation of sealed system 142, refrigerant flows from evaporator 146 and to compressor 144. For example, refrigerant may exit evaporator 146 as a fluid in the form of a superheated vapor. Upon exiting evaporator 146, the refrigerant may enter compressor 144, which is operable to compress the refrigerant and direct the compressed refrigerant to condenser 148. Accordingly, the pressure and temperature of the refrigerant may be increased in compressor 144 such that the refrigerant becomes a more superheated vapor.

Condenser 148 is disposed downstream of compressor 144 and is operable to reject heat from the refrigerant. For example, the superheated vapor from compressor 144 may enter condenser 148 and transfer energy to air surrounding condenser 148 (e.g., to create a flow of heated air). In this manner, the refrigerant condenses into a saturated liquid and/or liquid vapor mixture. A condenser fan (not shown) may be positioned adjacent condenser 148 and may facilitate or urge the flow of heated air across the coils of condenser 148 (e.g., from ambient atmosphere) in order to facilitate heat transfer.

According to the illustrated embodiment, an expansion device or a variable electronic expansion valve 150 may be further provided to regulate refrigerant expansion. During use, variable electronic expansion valve 150 may generally expand the refrigerant, lowering the pressure and temperature thereof. In this regard, refrigerant may exit condenser 148 in the form of high liquid quality/saturated liquid vapor mixture and travel through variable electronic expansion valve 150 before flowing through evaporator 146. Variable electronic expansion valve 150 is generally configured to be adjustable, e.g., such that the flow of refrigerant (e.g., volumetric flow rate in milliliters per second) through variable electronic expansion valve 150 may be selectively varied or adjusted.

Evaporator 146 is disposed downstream of variable electronic expansion valve 150 and is operable to heat refrigerant within evaporator 146, e.g., by absorbing thermal energy from air surrounding the evaporator (e.g., to create a flow of cooled air). For example, the liquid or liquid vapor mixture refrigerant from variable electronic expansion valve 150 may enter evaporator 146. Within evaporator 146, the refrigerant from variable electronic expansion valve 150 receives energy from the flow of cooled air and vaporizes into superheated vapor and/or high-quality vapor mixture. An air handler or evaporator fan 152 is positioned adjacent evaporator 146 and may facilitate or urge the flow of cooled air across evaporator 146 in order to facilitate heat transfer. From evaporator 146, refrigerant may return to compressor 144 and the vapor-compression cycle may continue.

As explained above, environmental control system 140 includes a sealed system 142 for providing a flow of heated air or a flow cooled air throughout climate-controlled chamber 122 as needed. To direct this air, environmental control system 140 may include a duct system 154 for directing the flow of temperature regulated air, identified herein simply as flow of air 156 (see, e.g., FIG. 3). In this regard, for example, evaporator fan 152 can generate a flow of cooled air as the air passes over evaporator 146 and a condenser fan (not shown) can generate a flow of heated air as the air passes over condenser 148.

This temperature-regulated flow of air 156 may be routed through a cooled air supply duct and/or heated air may be routed through a heated air supply duct (not shown). In this regard, it should be appreciated that environmental control system 140 may generally include a plurality of ducts, dampers, diverter assemblies, and/or air handlers to facilitate operation in a cooling mode, in a heating mode, in both a heating and cooling mode, or any other mode suitable for regulating the environment within climate-controlled chamber 122. It should be appreciated that duct system 154 may vary in complexity and may regulate the flows of air from sealed system 142 in any suitable arrangement through any suitable portion of climate-controlled chamber 122.

Although an exemplary sealed system 142 and duct system 154 are illustrated and described herein, it should be appreciated that variations and modifications may be made to sealed system 142 and/or duct system 154 while remaining within the scope of the present subject matter. For example, sealed system 142 may include additional or alternative components, duct system 154 may include additional or different ducting configurations, etc. For example, according to the illustrated embodiment, evaporator 146 and evaporator fan 152 may be positioned at top 104 of cabinet 102 and refrigerant may be routed from mechanical compartment 136 and through cabinet 102 to evaporator 146. In addition, it should be appreciated that gardening appliance 100 may have one or more subsystems integrated with or operably coupled to duct system 154 for filtering the flow of air 156, regulating the concentration of one or more gases within the flow of air 156, etc.

Referring now generally to FIGS. 1 through 7, gardening appliance 100 generally includes a rotatable carousel, referred to herein as a grow tower 160 that is mounted within liner 120, e.g., such that it is within climate-controlled chamber 122. More specifically, grow tower 160 may be positioned on top of a turntable 162 that is rotatably mounted to a sump 164 of gardening appliance 100. In general, grow tower 160 extends along the vertical direction V from sump 164 to a top wall 166 of climate-controlled chamber 122.

In addition, grow tower 160 is generally rotatable about a central axis 168 defined by turntable 162. Specifically, according to the illustrated embodiment, central axis 168 is parallel to the vertical direction V. However, it should be appreciated that central axis 168 could alternatively extend in any suitable direction, e.g., such as the horizontal direction (e.g., defined by the lateral direction L and the transverse direction T). In this regard, grow tower 160 generally defines an axial direction A, i.e., parallel to central axis 168, a radial direction R that extends perpendicular to central axis 168, and a circumferential direction C that extends around central axis 168 (e.g., in a plane perpendicular to central axis 168).

As illustrated, grow tower 160 may generally separate, divide, or partition climate-controlled chamber 122 into a plurality of grow chambers (e.g., identified generally by reference numeral 170). More specifically, grow chambers 170 are generally defined between grow tower 160 and liner 120 or between grow tower 160 and doors 130. In general, grow chambers 170 are intended to support the leafy growth of plants 124 (e.g., or other portions of plants 124 other than the plant roots). According to the illustrated embodiment, grow tower 160 divides climate control chamber 122 into three grow chambers 170, referred to herein generally as a first chamber, a second chamber, and a third chamber. As illustrated, these grow chambers 170 are circumferentially spaced relative to each other and define substantially separate and distinct growing environments. As such, each grow chamber 170 may receive plants 124 having different growth needs and the grow environment within each respective grow chamber 170 may be maintained as grow tower 160 is rotated within climate-controlled chamber 122.

In addition, according to the illustrated embodiment, grow tower 160 may generally define an internal chamber, referred to herein as a root chamber 172. In general, root chamber 172 may be substantially sealed relative to (or isolated from) grow chambers 170 and is configured for containing the roots of plants 124 throughout the growing process. As will be described in more detail below, grow tower 160 may generally define one or more apertures 174 that are defined through grow tower 160 to permit access between grow chambers 170 and root chamber 172. According to exemplary embodiments, these apertures 174 may be configured to receive plant pods 176 into root chamber 172.

Plant pods 176 generally contain seedlings, root balls, or other plant material for growing plants 124 positioned within a mesh or other support structure through which roots of plants 124 may grow within grow tower 160. A user may insert a portion of plant pod 176 (e.g., a seed end or root end) having the desired seeds through one of the plurality of apertures 174 into root chamber 172. A plant end (e.g., opposite the root end) of the plant pod 176 may remain within grow chamber 170 such that plants 124 may grow from grow tower 160 such that they are accessible by a user.

As will be explained below, water and other nutrients may be supplied to the root end of plant pods 176 within root chamber 172. For example, according to the illustrated embodiment, root chamber 172 may be operably coupled with sealed system 142 for facilitating suitable climate control within the root chamber 172, e.g., to achieve desirable growing conditions. Similarly, a hydration system may be configured to provide a flow of hydrating mist including water, nutrients, and other suitable constituents for providing the desirable growth environment for plants 124. According to exemplary embodiments, apertures 174 may be covered by a flat flapper seal or seal cap (not shown) to prevent hydrating mist from escaping root chamber 172 when no plant pod 176 is installed and to facilitate improved climate control within root chamber 172 and grow chambers 170.

Although grow tower 160 described and illustrated above includes a single root chamber 172, it should be appreciated that according to alternative exemplary embodiments, grow tower 160 may further include one or more internal dividers (not shown) that are positioned within root chamber 172 to divide root chamber 172 into a plurality of sub-chambers or root chambers. Each of these root chambers may be partially or substantially isolated from the other root chambers to facilitate independent climate control, hydration, gas regulation, etc. In addition, each of these root chambers may be in fluid communication with one of the plurality of grow chambers 170 through the plurality of apertures 174.

Notably, it may be desirable according to exemplary embodiments to form a fluid-tight seal between the grow tower 160 and liner 120. In this manner, as grow tower 160 rotates within climate-controlled chamber 122, grow chambers 170 may remain fluidly isolated from each other. Therefore, according to an exemplary embodiment, grow tower 160 may generally define a grow module diameter (e.g., defined by its substantially circular footprint formed in a horizontal plane). Similarly, enclosed back portion 126 of liner 120 may be substantially cylindrical and may define a liner diameter (not labeled). In order to prevent a significant amount of air from escaping between grow tower 160 and liner 120, and in order to fluidly isolate the various grow chambers 170, the liner diameter may be substantially equal to or slightly larger than the grow module diameter.

Figure 7:
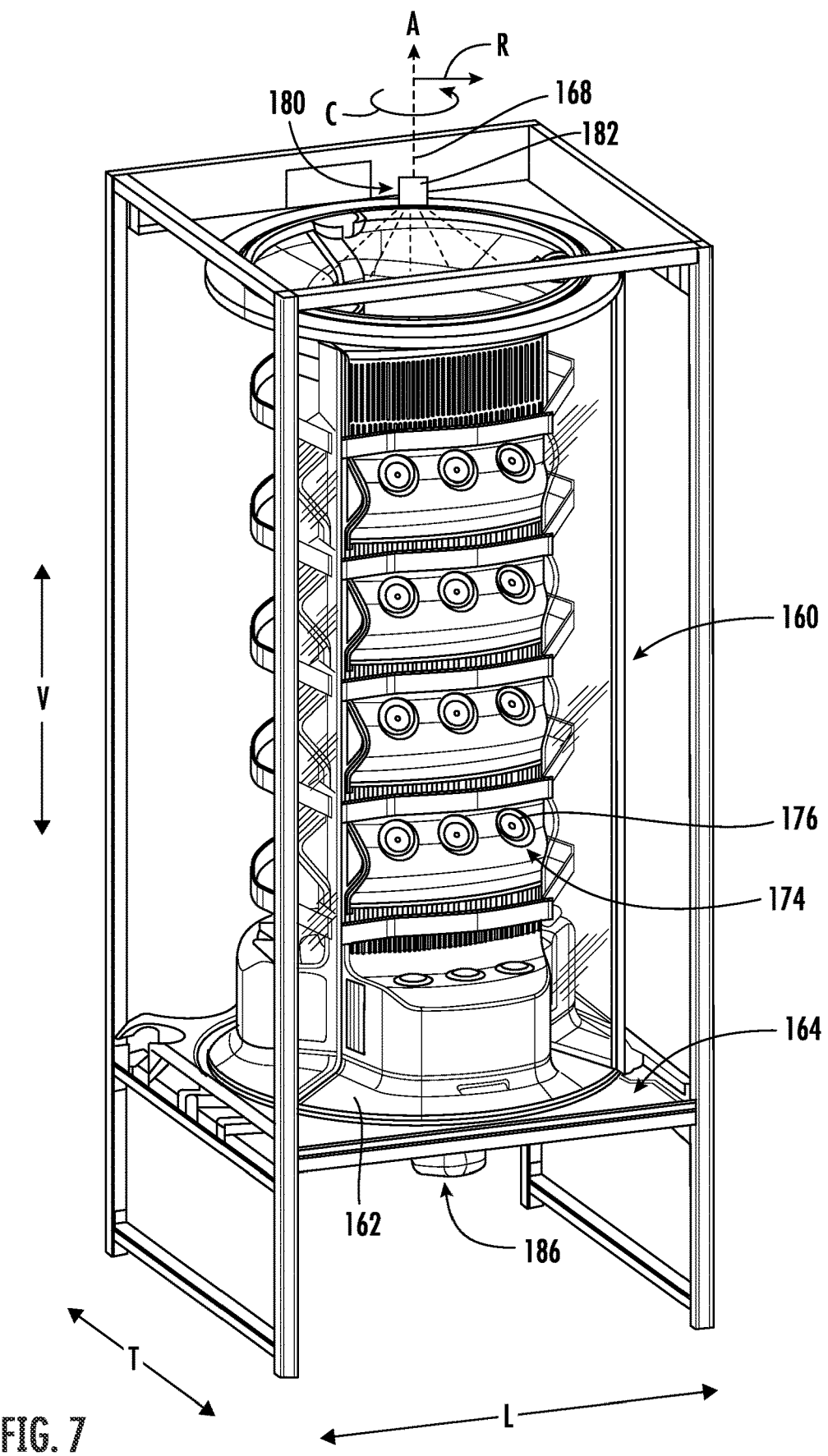
FIG. 7 provide a perspective view of a grow tower of the exemplary gardening appliance of FIG. 1 according to an exemplary embodiment of the present subject matter.

As shown for example in FIG. 7, environmental control system 140 may further include a hydration system 200 which is generally configured for providing water and/or nutrients to plants 124 to support their growth. Specifically, as will be described in more detail below, hydration system 200 may be fluidly coupled to a water supply and or nutrient distribution assembly to selectively provide desirable quantities and concentrations of hydration, nutrients, and/or other fluids onto plants 124 to facilitate improved plant growth.

Notably, environmental control system 140 described above is generally configured for regulating the temperature and humidity (e.g., or some other suitable water level quantity or measurement) within one or all of the plurality of chambers 170 and/or root chambers 172 independently of each other. In this manner, a versatile and desirable growing environment may be obtained for each and every chamber 170.

Figure 5:
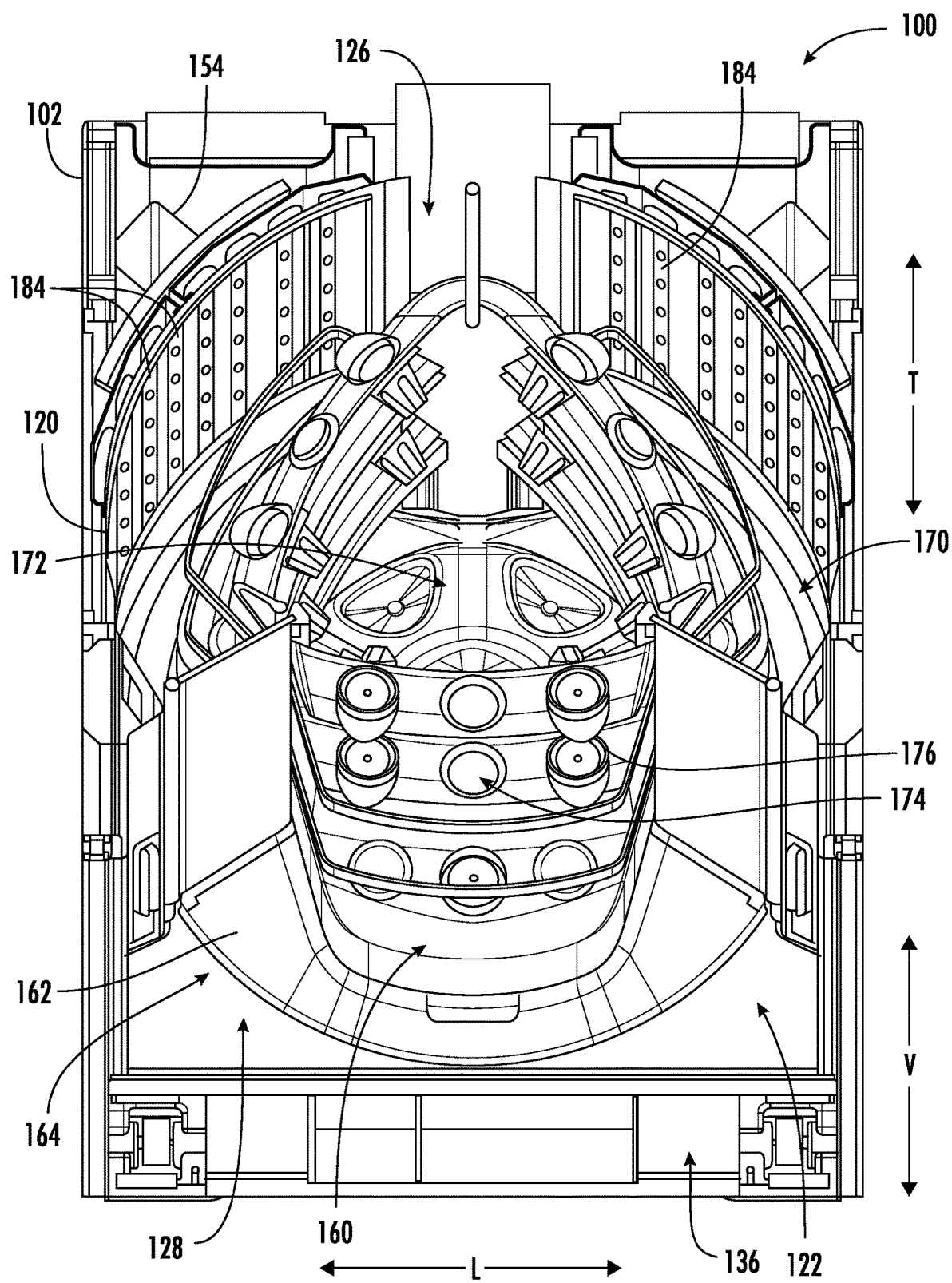
FIG. 5 is a perspective cross-sectional view of the exemplary gardening appliance of FIG. 1, taken along Line 5-5 from FIG. 2.
Figure 6:
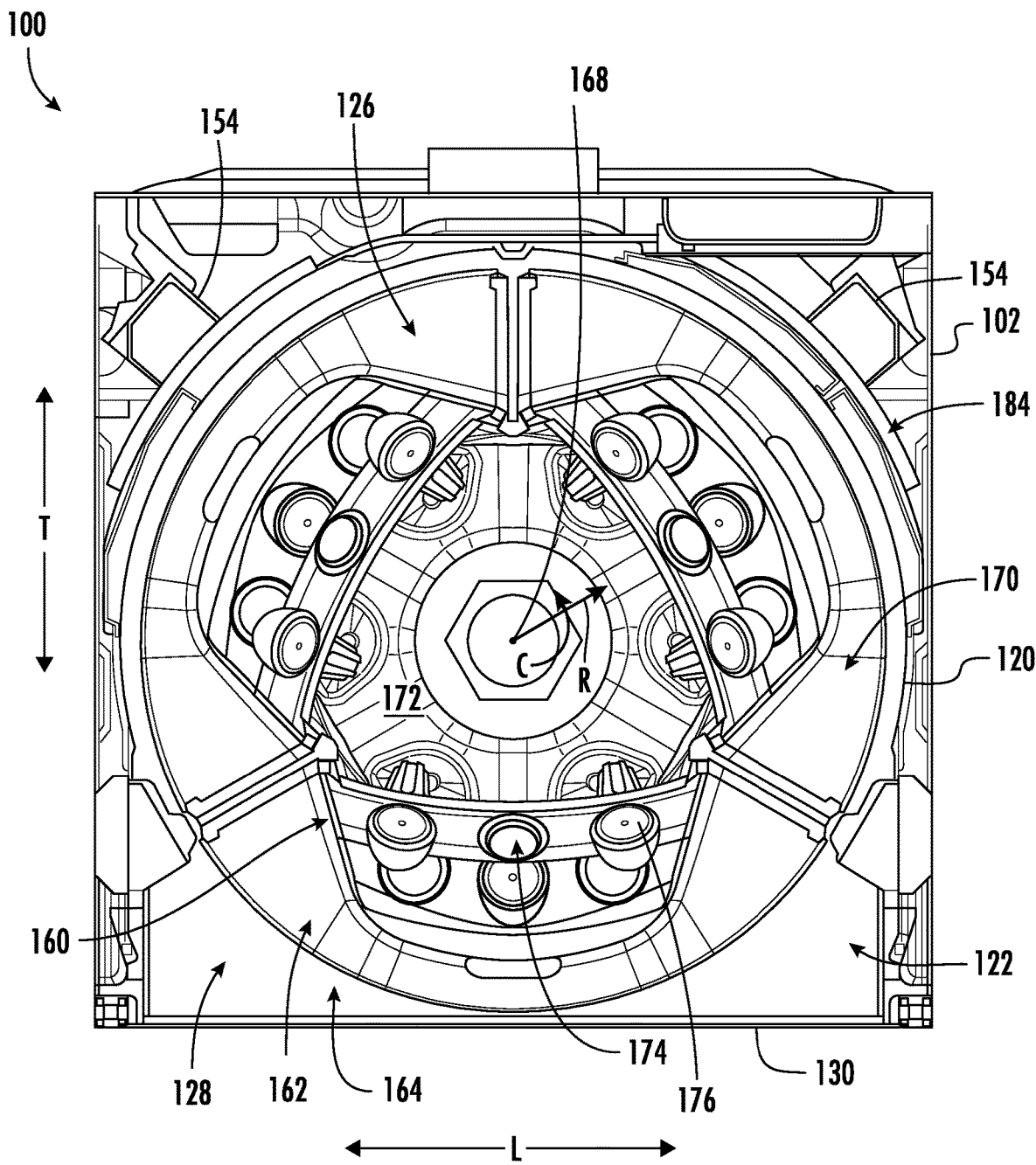
FIG. 6 is a top cross-sectional view of the exemplary gardening appliance of FIG. 1, taken along Line 5-5 from FIG. 2.

Referring now for example to FIGS. 5 and 6, gardening appliance 100 may further include a light assembly 184 which is generally configured for providing light into selected grow chambers 170 to facilitate photosynthesis and growth of plants 124. As shown, light assembly 184 may include a plurality of light sources (not labeled) stacked in an array, e.g., extending along the vertical direction V. For example, light assembly 184 may be mounted directly to liner 120 within climate-controlled chamber 122 or may alternatively be positioned behind liner 120 such that light is projected through a transparent window or light pipe into climate-controlled chamber 122. The position, configuration, and type of light sources described herein are not intended to limit the scope of the present subject matter in any manner.

Light assembly 184 may include any suitable number, type, position, and configuration of electrical light source(s), using any suitable light technology and illuminating in any suitable color. For example, according to the illustrated embodiment, light assembly 184 includes one or more light emitting diodes (LEDs), which may each illuminate in a single color (e.g., white LEDs), or which may each illuminate in multiple colors (e.g., multi-color or RGB LEDs) depending on the control signal from controller 196. However, it should be appreciated that according to alternative embodiments, light assembly 184 may include any other suitable traditional light bulbs or sources, such as halogen bulbs, fluorescent bulbs, incandescent bulbs, glow bars, a fiber light source, etc.

As explained above, light generated from light assembly 184 may result in light pollution within a room where gardening appliance 100 is located. Therefore, aspects of the present subject matter are directed to features for reducing light pollution, or to the blocking of light from light assembly 184 through front display opening 128. Specifically, as illustrated, light assembly 184 is positioned only within the enclosed back portion 126 of liner 120 such that only grow chambers 170 which are in a sealed position are exposed to light from light assembly 184. Specifically, grow tower 160 acts as a physical partition between light assemblies 184 and front display opening 128. In this manner, as illustrated in FIG. 5, no light may pass from the first or second grow chambers 170 (i.e., the "rear" or enclosed grow chambers 170) through grow tower 160 and out through front display opening 128. As grow tower 160 rotates, two of the three grow chambers 170 will receive light from light assembly 184 at a time. According to still other embodiments, a single light assembly may be used to reduce costs, whereby only a single grow chamber 170 will be illuminated at a single time.

Referring now specifically to FIGS. 3 and 7, gardening appliance 100 may further include a motor assembly 186 or another suitable driving element or device for selectively rotating grow tower 160 during operation of gardening appliance 100. In this regard, according to the illustrated embodiment, motor assembly 186 is positioned below grow tower 160, e.g., within mechanical compartment 136, and may be mechanically coupled to turntable 162 for selectively rotating turntable 162 and grow tower 160 about central axis 168.

As used herein, "motor" may refer to any suitable drive motor and/or transmission assembly for rotating turntable 162 and grow tower 160. For example, motor assembly 186 may include a brushless DC electric motor, a stepper motor, or any other suitable type or configuration of motor. For example, motor assembly 186 may include an AC motor, an induction motor, a permanent magnet synchronous motor, or any other suitable type of AC motor. In addition, motor assembly 186 may include any suitable transmission assemblies, clutch mechanisms, or other components.

Referring again to FIG. 2, gardening appliance 100 may include a control panel 190 that may represent a general-purpose Input/Output ("GPIO") device or functional block for gardening appliance 100. In some embodiments, control panel 190 may include or be in operative communication with one or more user input devices 192, such as one or more of a variety of digital, analog, electrical, mechanical, or electro-mechanical input devices including rotary dials, control knobs, push buttons, toggle switches, selector switches, and touch pads.

Additionally, gardening appliance 100 may include a display 194, such as a digital or analog display device generally configured to provide visual feedback regarding the operation of gardening appliance 100. For example, display 194 may be provided on control panel 190 and may include one or more status lights, screens, or visible indicators. According to exemplary embodiments, user input devices 192 and display 194 may be integrated into a single device, e.g., including one or more of a touchscreen interface, a capacitive touch panel, a liquid crystal display (LCD), a plasma display panel (PDP), a cathode ray tube (CRT) display, or other informational or interactive displays.

Gardening appliance 100 may further include or be in operative communication with a processing device or a controller 196 that may be generally configured to facilitate appliance operation. In this regard, control panel 190, user input devices 192, and display 194 may be in communication with controller 196 such that controller 196 may receive control inputs from user input devices 192, may display information using display 194, and may otherwise regulate operation of gardening appliance 100. For example, signals generated by controller 196 may operate gardening appliance 100, including any or all system components, subsystems, or interconnected devices, in response to the position of user input devices 192 and other control commands. Control panel 190 and other components of gardening appliance 100 may be in communication with controller 196 via, for example, one or more signal lines or shared communication busses. In this manner, Input/Output ("I/O") signals may be routed between controller 196 and various operational components of gardening appliance 100.

As used herein, the terms "processing device," "computing device," "controller," or the like may generally refer to any suitable processing device, such as a general or special purpose microprocessor, a microcontroller, an integrated circuit, an application specific integrated circuit (ASIC), a digital signal processor (DSP), a field-programmable gate array (FPGA), a logic device, one or more central processing units (CPUs), a graphics processing units (GPUs), processing units performing other specialized calculations, semiconductor devices, etc. In addition, these "controllers" are not necessarily restricted to a single element but may include any suitable number, type, and configuration of processing devices integrated in any suitable manner to facilitate appliance operation. Alternatively, controller 196 may be constructed without using a microprocessor, e.g., using a combination of discrete analog and/or digital logic circuitry (such as switches, amplifiers, integrators, comparators, flipflops, AND/OR gates, and the like) to perform control functionality instead of relying upon software.

Controller 196 may include, or be associated with, one or more memory elements or non-transitory computer-readable storage mediums, such as RAM, ROM, EEPROM, EPROM, flash memory devices, magnetic disks, or other suitable memory devices (including combinations thereof). These memory devices may be a separate component from the processor or may be included onboard within the processor. In addition, these memory devices can store information and/or data accessible by the one or more processors, including instructions that can be executed by the one or more processors. It should be appreciated that the instructions can be software written in any suitable programming language or can be implemented in hardware. Additionally, or alternatively, the instructions can be executed logically and/or virtually using separate threads on one or more processors.

For example, controller 196 may be operable to execute programming instructions or micro-control code associated with an operating cycle of gardening appliance 100. In this regard, the instructions may be software or any set of instructions that when executed by the processing device, cause the processing device to perform operations, such as running one or more software applications, displaying a user interface, receiving user input, processing user input, etc. Moreover, it should be noted that controller 196 as disclosed herein is capable of and may be operable to perform any methods, method steps, or portions of methods as disclosed herein. For example, in some embodiments, methods disclosed herein may be embodied in programming instructions stored in the memory and executed by controller 196.

The memory devices may also store data that can be retrieved, manipulated, created, or stored by the one or more processors or portions of controller 196. The data can include, for instance, data to facilitate performance of methods described herein. The data can be stored locally (e.g., on controller 196) in one or more databases and/or may be split up so that the data is stored in multiple locations. In addition, or alternatively, the one or more database(s) can be connected to controller 196 through any suitable network(s), such as through a high bandwidth local area network (LAN) or wide area network (WAN). In this regard, for example, controller 196 may further include a communication module or interface that may be used to communicate with one or more other component(s) of gardening appliance 100, controller 196, an external appliance controller, or any other suitable device, e.g., via any suitable communication lines or network(s) and using any suitable communication protocol. The communication interface can include any suitable components for interfacing with one or more network(s), including for example, transmitters, receivers, ports, controllers, antennas, or other suitable components.

According to an exemplary embodiment, motor assembly 186 may be operably coupled to controller 196, which is programmed to rotate grow tower 160 according to predetermined operating cycles, based on user inputs (e.g., via touch buttons 192), etc. In addition, controller 196 may be communicatively coupled to one or more sensors, such as temperature or humidity sensors, positioned within the various chambers 170 for measuring temperatures and/or humidity, respectively. Controller 196 may then operate motor assembly 186 in order to maintain desired environmental conditions for each of the respective chambers 170. For example, as described herein, gardening appliance 100 includes features or subsystems for providing certain locations of gardening appliance 100 with light, temperature control, proper moisture, nutrients, and other requirements for suitable plant growth. Motor assembly 186 may be used to position specific chambers 170 where needed to receive such growth requirements.

According to an exemplary embodiment, such as where grow tower 160 divides climate-controlled chamber 122 into three grow chambers 170, controller 196 may operate motor assembly 186 to index grow tower 160 sequentially through a number of preselected positions. More specifically, motor assembly 186 may rotate grow tower 160 in a counterclockwise direction (e.g., when viewed from a top of grow tower 160) in 120° increments to move chambers 170 between sealed positions and display positions. As used herein, a chamber 170 is considered to be in a "sealed position" when that chamber 170 is substantially sealed between grow tower 160 and liner 120. By contrast, a chamber 170 is considered to be in a "display position" when that chamber 170 is at least partially exposed to front display opening 128, such that a user may access plants 124 positioned within that chamber 170.

Figure 4:
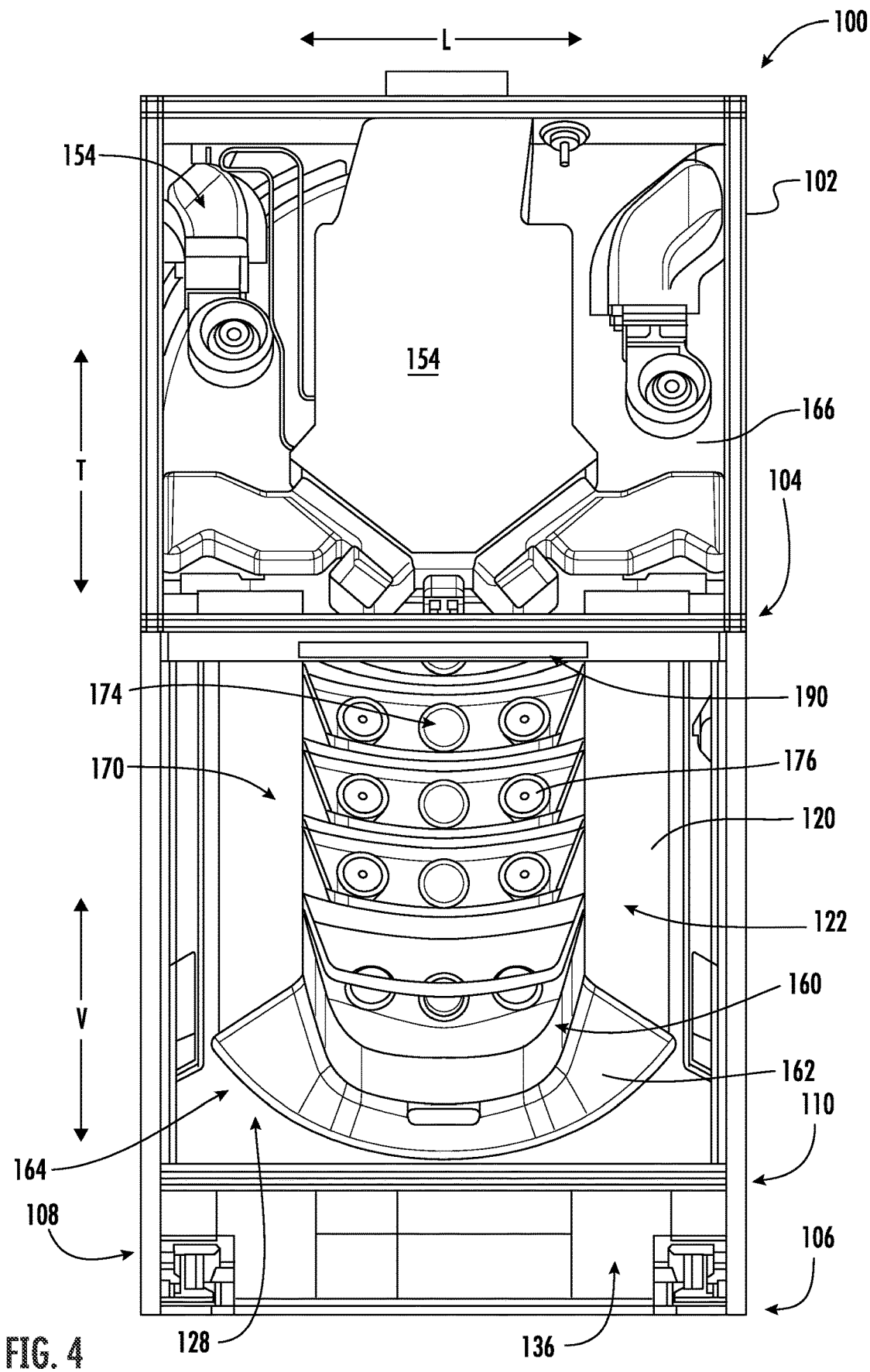
FIG. 4 is a top perspective view of the exemplary gardening appliance of FIG. 1, with a top panel and doors removed according to an exemplary embodiment of the present subject matter.

For example, as illustrated in FIGS. 4 and 5, the first grow chamber and the second grow chamber (i.e., the rear chambers) are both in a sealed position, whereas the third grow chamber (i.e., the front chamber) is in a display position. As motor assembly 186 rotates grow tower 160 by 120 degrees in the counterclockwise direction, the second grow chamber will enter the display position, while the first grow chamber and the third grow chamber will be in the sealed positions. Motor assembly 186 may continue to rotate grow tower 160 in such increments to cycle grow chambers 170 between these sealed and display positions.

Gardening appliance 100 and grow tower 160 have been described above to explain an exemplary embodiment of the present subject matter. However, it should be appreciated that variations and modifications may be made while remaining within the scope of the present subject matter. For example, according to alternative embodiments, gardening appliance 100 may be a simplified to a two-chamber embodiment with a square liner 120 and a grow tower 160 that divides the climate-controlled chamber 122 in half to define a first grow chamber and a second grow chamber. According to such an embodiment, by rotating grow tower 160 by 200 degrees about central axis 168, the first chamber may alternate between the sealed position (e.g., facing rear side 114 of cabinet 102) and the display position (e.g., facing front side 112 of cabinet 102). By contrast, the same rotation will move the second chamber from the display position to the sealed position.

According to still other embodiments, gardening appliance 100 may include a three chamber grow tower 160 but may have a modified cabinet 102 such that front display opening 128 is wider and two of the three grow chambers 170 are displayed at a single time. Thus, the first grow chamber may be in the sealed position, while the second grow chamber and the third grow chamber may be in the display positions. As grow tower 160 is rotated counterclockwise, the first grow chamber is moved into the display position and the third grow chamber is moved into the sealed position.

Referring now to generally to FIGS. 7 through 10, hydration system 200 will be described in more detail according to an exemplary embodiment of the present subject matter. Although an exemplary embodiment of hydration system 200 is described herein, it should be appreciated that variations and modifications may be made to hydration system 200 while remaining within the scope of the present subject matter. In addition, it should be appreciated that hydration system 200 is not limited to the exemplary application described herein. Indeed, hydration system 200 may be used within any gardening appliance.

For example, hydration system 200 includes a plurality of nozzles (e.g., identified herein generally by reference numeral 202) that are positioned and configured for providing a spray of fluid onto the roots of plants 124 within climate-controlled chamber 122. For example, each nozzle 202 may be a fine mist spray nozzle or nozzles configured for selectively discharging and directing a flow of fluid (e.g., identified herein generally by reference numeral 204) including water and/or nutrients toward roots of the plurality of plants 124. The flow of fluid 204 may be provided from one or more water supplies 206. For example, water supply 206 may be a reservoir containing water (e.g., distilled water) or may be a direct connection municipal water supply. According to exemplary embodiments, hydration system 200 may include one or more nutrient supplies 208 for supplementing the flow of fluid 204 with one or more nutrients. For example, nutrient supply 208 may include one or more pumps or supply cartridges that provide or inject a flow of liquid nutrients into water supply 206 or directly into flow of fluid 204.

In general, water supply 206 and nutrient supply 208 may selectively supply each nozzle 202 with water that may be mixed with nutrients such as calcium, magnesium, potassium, sulfur, copper, zinc, boron, molybdenum, iron, cobalt, manganese, phosphorous, and chlorine. According to alternative embodiments, any other suitable mixture for encouraging root/plant growth may be used while remaining within the scope of the present subject matter. Each nozzle 202 may be configured for selectively discharging high pressure atomized fluid 204 or mist including such water, nutrients, and/or other substances which may facilitate improved root growth of plants 124.

Figure 8:
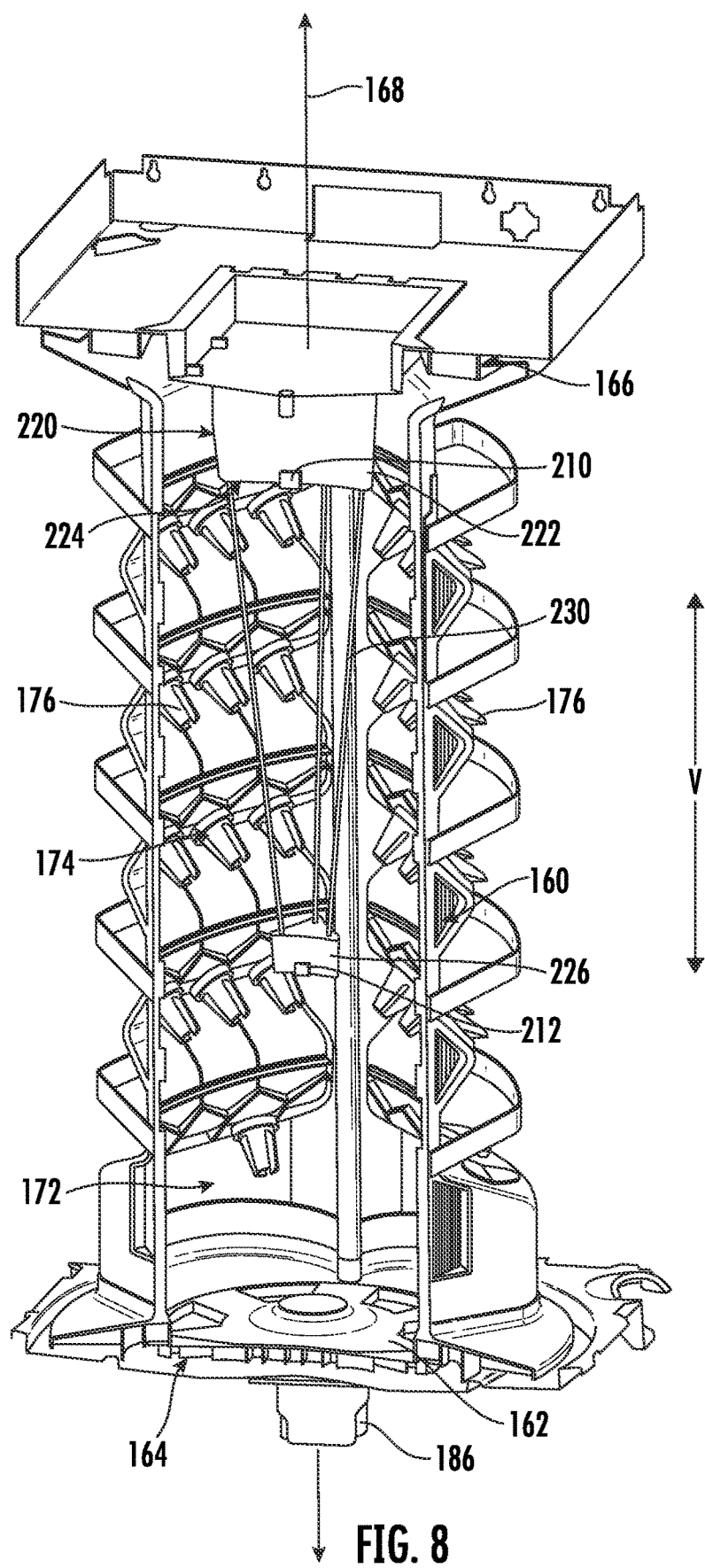
FIG. 8 provides a perspective view of hydration system that may be used with the exemplary gardening appliance of FIG. 1 according to an exemplary embodiment of the present subject matter.
Figure 9:
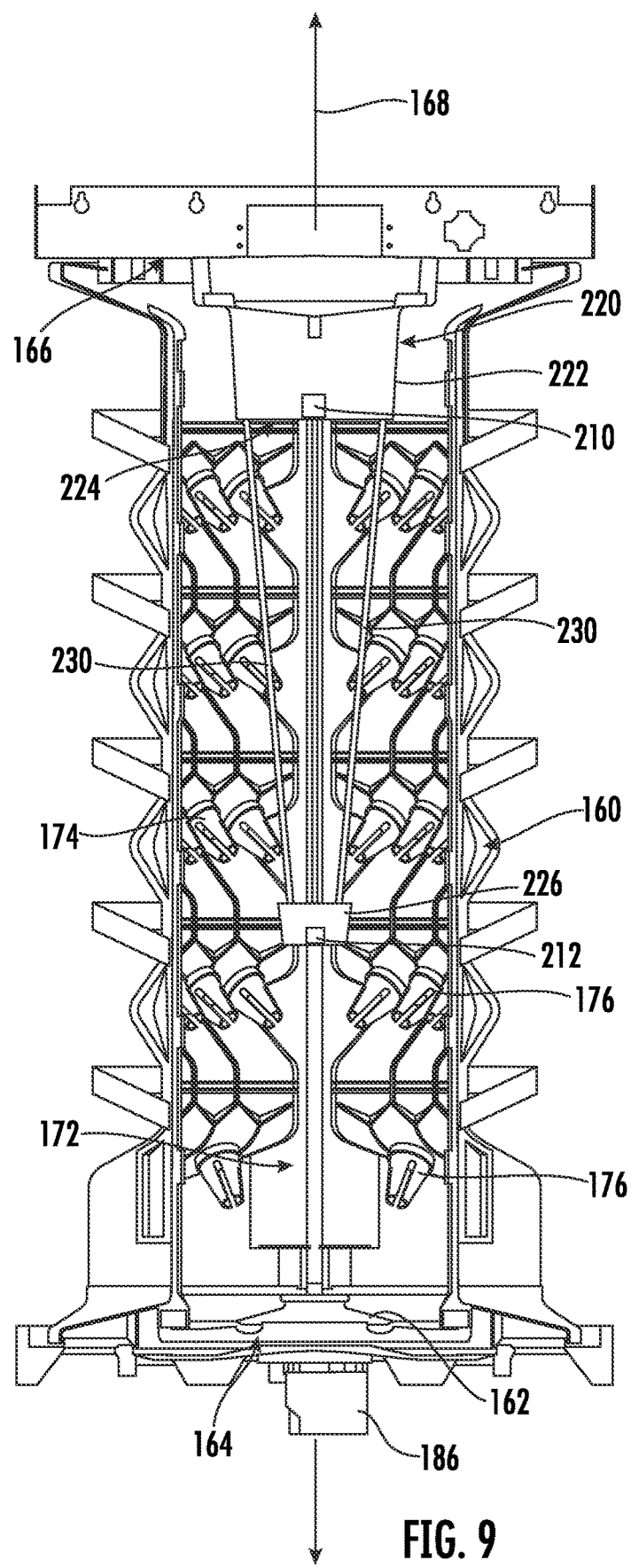
FIG. 9 provides front view of the exemplary hydration system of FIG. 9 according to an exemplary embodiment of the present subject matter.
Figure 10:
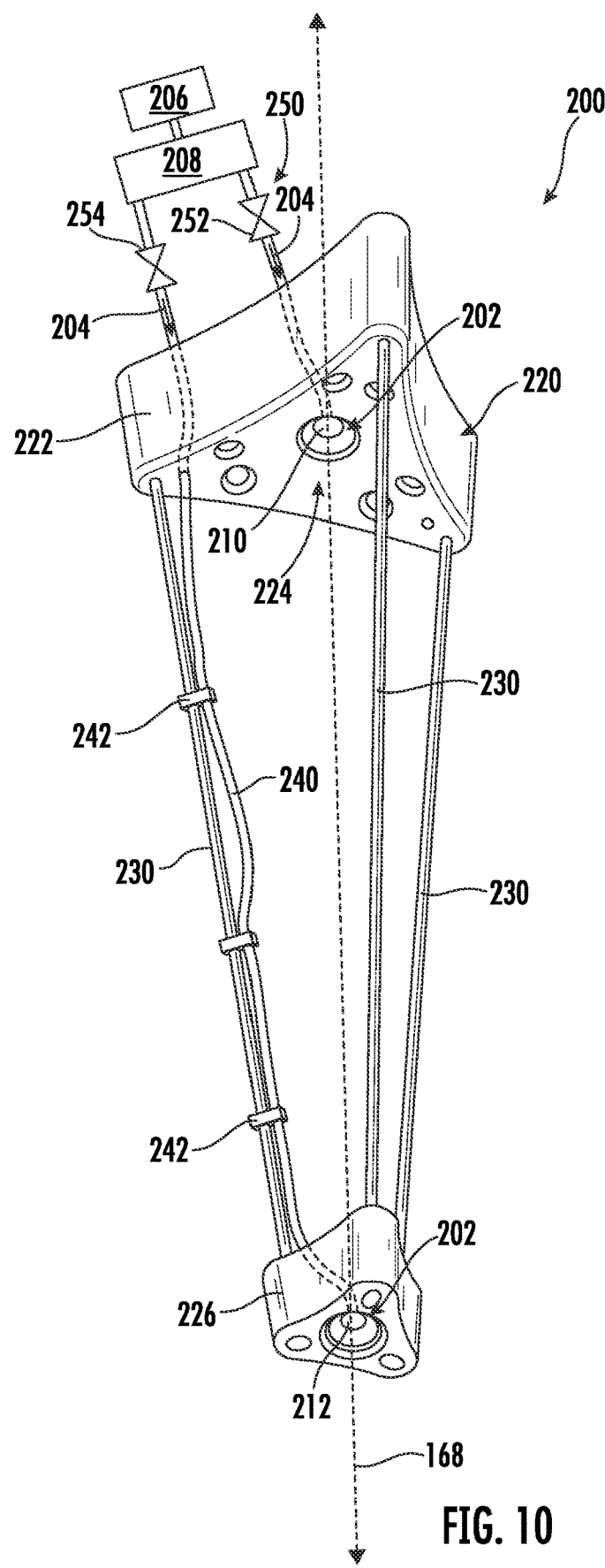
FIG. 10 provides a perspective view of a nozzle support frame of the exemplary hydration system of FIG. 9 according to an exemplary embodiment of the present subject matter.

Referring now specifically to FIGS. 8 through 10, the plurality of nozzles 202 of hydration system 200 may generally include an upper nozzle 210 that is mounted proximate a top of root chamber 172 and a lower nozzle 212 that is mounted proximate a bottom of root chamber 172. More specifically, according to the illustrated embodiment, root chamber 172 may be defined at least partially by top wall 166 of root chamber 172 at a top end and turntable 162 at a bottom end. Upper nozzle 210 may be mounted directly to top wall 166 (or via a suitable support structure) and lower nozzle 212 may be suspended just above turntable 162 as described in more detail below. Collectively, these nozzles 202 may be configured for charging root chamber 172 with mist (e.g., flow of fluid 204) for hydrating the roots of plants 124.

According to the illustrated embodiment, hydration system 200 includes a nozzle support frame 220 that is mounted to top wall 166 of root chamber 172. In general, nozzle support frame 220 is configured to support upper nozzle 210 and/or lower nozzle 212. Although upper nozzle 210 and lower nozzle 212 are illustrated as being directly attached to nozzle support frame 220, it should be appreciated that upper nozzle 210 and/or lower nozzle 212 may alternatively be supported by a fluid conduit that extends from nozzle support frame 220. Although an exemplary nozzle support frame 220 is illustrated and described herein for purposes of explaining aspects of the present subject matter, it should be appreciated that variations and modifications may be made to nozzle support frame 220 and/or hydration system 200 while remaining within the scope of the present subject matter.

According to the illustrated embodiment, nozzle support frame 220 may generally include an upper mounting structure 222 that is mechanically coupled to gardening appliance 100. More specifically, according to exemplary embodiments, upper mounting structure 222 may be mounted to top wall 166 of climate-controlled chamber 122 such that it has a fixed vertical position and does not rotate along with grow tower 160. According to exemplary embodiments, upper nozzle 210 may be directly mounted to upper mounting structure 222, e.g., on a bottom surface 224 of upper mounting structure 222.

In addition, nozzle support frame 220 may include a lower support structure 226 that is generally configured for receiving lower nozzle 212. According to the illustrated embodiment, lower support structure 226 may be positioned proximate a bottom of root chamber 172. According to the illustrated embodiment, nozzle support frame 220 may further include a plurality of support arms 230 that extend between and mechanically couple upper mounting structure 222 and lower support structure 226.

In general, support arms 230 may be any structure that is suitably rigid for coupling upper mounting structure 222 and lower support structure 226 such that lower support structure 226 does not rotate along with grow tower 160 but is instead rotationally fixed relative to upper mounting structure 222. According to the illustrated embodiment, upper nozzle 210 and lower nozzle 212 may generally be mounted to nozzle support frame 220 along central axis 168 of grow tower 160. In this manner, upper nozzle 210 and lower nozzle 212 may equally hydrate plants 124 positioned within each grow chamber 170. More specifically, upper nozzle 210 may be mounted to upper mounting structure 222 at central axis 168 and may be oriented such that it sprays substantially downward along the vertical direction V. Lower nozzle 212 may be mounted to lower support structure 226 and may oriented such that sprays in any suitable direction (e.g., up, down, or laterally depending on the vertical location of the nozzle).

Notably, if a nozzle is supported by a support arm that extends along central axis 168 of grow tower 160, roots of plants 124 may have a tendency to attach to the support arm and/or the lower nozzle. In this regard, because such a support arm or nozzle is at substantially the same radial location as central axis 168, the outer radial positions of these structure do not travel across a large arc length (e.g., when viewed by the rotating grow tower 160) and roots may easily wrap around the support arm or nozzle. Notably, as explained briefly above, such wrapping and root engagement can block the discharge from nozzles, can twist and break supply tubing, or may move or displace the lower nozzle such that the spray pattern is less efficient. Accordingly, aspects of the present subject matter are directed to nozzle support frame 220 which includes features for reducing the likelihood of root engagement with nozzle support frame 220, upper nozzle 210, and/or lower nozzle 212.

Specifically, according to the illustrated embodiment, at least one of the plurality of support arms 230 may be positioned and oriented such that it is off-axis relative to central axis 168 of grow tower 160. In this regard, by increasing the radial distance between central axis 168 and support arms 230, the arc length traveled by support arms 230 (e.g., when viewed by the rotating grow tower 160) is much larger and such support arms act to sweep roots out of the way and prevent attachment to nozzle support frame 220.

Although a single support arm 230 may be sufficient to sweep roots of plants 124 away from nozzle support frame 220, it should be appreciated that nozzle support frame 220 may include any suitable number, size, and configuration of support arms 230. In addition, some or all of support arms 230 may be positioned off-axis relative to central axis 168. For example, according to the illustrated embodiment, nozzle support frame 220 includes three support arms 230 that are spaced apart about the circumferential direction C, and each of which is off-axis relative to central axis 168.

In addition, according to the illustrated embodiment, the plurality of support arms may be angled relative to central axis 168 such that nozzle support frame 220 forms a conical shape that tapers toward lower nozzle 212. In other words, support arms 230 may decrease in radial distance from central axis 168 as they approach lower support structure 226 or are otherwise tapered toward lower support structure 226 (e.g., forming an inverted tripod). However, it should be appreciated that according to alternative embodiments, nozzle support frame 220 may include four or more support arms 230 that are substantially parallel to central axis 168 such that nozzle support frame 220 is substantially cylindrical.

Lower nozzle 212 may be fluidly coupled to water supply 206 through one or more sections of conduit that are supported by nozzle support frame 220. Specifically, according to the illustrated embodiment, hydration system 200 includes a flexible supply conduit 240 that is fluidly coupled to water supply 206 and passes through top wall 166 of root chamber 172. Flexible supply conduit 240 may be routed along support arms 230 of nozzle support frame 220. More specifically, nozzle support frame 220 may define one or more conduit clips 242 for neatly routing flexible supply conduit 240. In this manner, flexible supply conduit 240 will not obstruct or interfere with the flow of fluid 204 ejected from upper nozzle 210 or lower nozzle 212.

Each nozzle 202 may have the same or a unique spray pattern and/or each nozzle 202 may have an adjustable spray pattern, e.g., to discharge a fine mist broadly or to direct a pinpoint stream at desired locations. In this regard, according to the illustrated embodiment, upper nozzle 210 and lower nozzle 212 may generally be oriented downward along the vertical direction V such that the flow of fluid 204 is directed down and out along the radial direction R. However, it should be appreciated that according to alternative embodiments, it may be desirable to mount lower nozzle 212 even lower than that shown (e.g., immediately adjacent turntable 162) and reverse its orientation such that it discharges fluid 204 upward and outward along the radial direction R. These variations and modifications are contemplated within the scope of the present subject matter.

According to the illustrated embodiment, each of upper nozzle 210 and lower nozzle 212 generally direct a cone-shaped spray having different cone angles. According to the illustrated embodiment, the upper cone angle and lower cone angle may vary from each other and may be between about 10° and 170°, between about 30° and 150°, between about 50° and 130°, between about 70° and 110°, or about 90°. Because various plants 124 may require different amounts of water for desired growth, hydration system 200 may alternatively include additional nozzles 202, e.g., for providing different concentrations of hydration and/or nutrients to different regions within root chamber 172. For example, hydration system 200 may include an intermediate nozzle mounted to nozzle support frame 220 between upper nozzle 210 and lower nozzle 212 along the vertical direction V.

Each of these nozzles 202 may be coupled to water supply 206 or another suitable fluid supply and may be independently controlled and regulated. In this regard, for example, hydration assembly 200 may include a valve assembly 250 for selectively regulating the flow of fluid 204 through each nozzle 202. In other words, valve assembly 250 may regulate the flow rates, dispensing times, hydration volumes, and nutrient concentrations dispensed through upper nozzle 210 and lower nozzle 212 independently.

Specifically, as illustrated, valve assembly 250 may have a dedicated control valve for regulating the flow of fluid 204 supplied to each nozzle 202. In this regard, valve assembly 250 may include an upper valve 252 that is fluidly coupled to upper nozzle 210 and a lower valve 254 that is fluidly coupled to lower nozzle 212. According to exemplary embodiments, controller 196 of gardening appliance 100 may independently and selectively regulate upper valve 252 and lower valve 254 to provide plants 124 with a hydration at the desired times, quantities, nutrient concentrations, etc.

According to exemplary embodiments, upper nozzle 210 is generally responsible for hydrating the majority of plants 124 within grow tower 160, whereas lower nozzle 212 may only be responsible for hydrating the lower level of plants 124. Accordingly, controller 196 may generally be configured to provide a larger volume of fluid to upper nozzle 210 than to lower nozzle 212. For example, upper nozzle 210 may be supplied with two times, four times, six times, eight times, or ten times the volume of fluid 204 than lower nozzle 212. It should be appreciated that controller 196 may regulate valve assembly 250 in any other suitable manner for ensuring that all plants 124 within grow tower 160 are properly hydrated.

As explained above, aspects of the present subject matter are generally directed to a rigid nozzle support frame (e.g., such as a tripod structure) with nozzle arrangements to supply nutrient mist to roots inside an aeroponic system. The nozzle support frame may be mounted within the root chamber of the grow tower and remains stationary relative to the grow tower. Upper and lower parts of the tripod structure are spaced apart by the connecting members or support arms that are offset or off-axis relative to a central rotational axis of the grow tower. Accordingly, as the grow tower rotates, the roots attached to the stationary tripod structure will be swept away and proper distribution of the mist may be achieved.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:
1. A gardening appliance defining a vertical direction, the gardening appliance comprising:

a liner positioned within a cabinet and defining a grow chamber;

a turntable mounted within the cabinet and being rotatable about a central axis;

a grow tower positioned on the turntable and defining a root chamber;

a plurality of apertures defined through the grow tower, the plurality of apertures being configured for receiving a plurality of plant pods that grow a plurality of plants;

a hydration system for hydrating the plurality of plants, the hydration system comprising:

a nozzle support frame mounted at a top of the root chamber, the nozzle support frame comprising a plurality of support arms, at least one of the plurality of support arms being off-axis relative to the central axis of the grow tower;

an upper nozzle mounted to the nozzle support frame proximate a top of the root chamber;

a lower nozzle mounted to the nozzle support frame proximate a bottom of the root chamber; and a water supply for supplying a flow of fluid to at least one of the upper nozzle or the lower nozzle.

2. The gardening appliance of claim 1, wherein at least two of the plurality of support arms are off-axis relative to the central axis.

3. The gardening appliance of claim 1, wherein the plurality of support arms comprises three support arms.

4. The gardening appliance of claim 1, wherein each of the plurality of support arms extends substantially parallel to the central axis such that nozzle support frame is substantially cylindrical.

5. The gardening appliance of claim 1, wherein each of the plurality of support arms are angled relative to the central axis such that the nozzle support frame forms a conical shape that tapers toward the lower nozzle.

6. The gardening appliance of claim 1, wherein the nozzle support frame comprises:

an upper mounting structure that is mechanically coupled to the gardening appliance and does not rotate with the grow tower; and a lower support structure for receiving the lower nozzle, wherein the plurality of support arms extend between and mechanically couple the upper mounting structure and the lower support structure.

7. The gardening appliance of claim 1, wherein the hydration system further comprises:

a supply conduit that extends from a top of the nozzle support frame down to the lower nozzle along at least one of the plurality of support arms.

8. The gardening appliance of claim 1, wherein the hydration system further comprises:

a valve assembly for selectively regulating the flow of fluid through the upper nozzle and the lower nozzle.

9. The gardening appliance of claim 8, wherein the valve assembly comprises:

a first valve fluidly coupled to the upper nozzle for regulating the flow of fluid through the upper nozzle; and a second valve fluidly coupled to the lower nozzle for regulating the flow of fluid through the lower nozzle.

10. The gardening appliance of claim 1, wherein the hydration system further comprises:

an intermediate nozzle mounted to the nozzle support frame between the upper nozzle and the lower nozzle along the vertical direction.

11. The gardening appliance of claim 1, further comprising:

a motor assembly operably coupled to the grow tower for selectively rotating the grow tower relative to the nozzle support frame.

12. The gardening appliance of claim 1, wherein the upper nozzle is oriented downward along the vertical direction and the lower nozzle is oriented upward along the vertical direction.

13. The gardening appliance of claim 1, wherein both the upper nozzle and the lower nozzle are mounted along the central axis of the grow tower.

14. A hydration system for a gardening appliance, the gardening appliance comprising a turntable rotatably mounted within a cabinet and supporting a grow tower defining a root chamber, the hydration system comprising:

a nozzle support frame mounted at a top of the root chamber, the nozzle support frame comprising a plurality of support arms, at least one of the plurality of support arms being off-axis relative to a central axis of the grow tower, wherein each of the plurality of support arms extends substantially parallel to the central axis such that nozzle support frame is substantially cylindrical;

an upper nozzle mounted to the nozzle support frame proximate a top of the root chamber;

a lower nozzle mounted to the nozzle support frame proximate a bottom of the root chamber; and a water supply for supplying a flow of fluid to at least one of the upper nozzle or the lower nozzle.

15. The hydration system of claim 14, wherein at least two of the plurality of support arms are off-axis relative to the central axis.

16. The hydration system of claim 14, wherein the plurality of support arms comprises three support arms.

17. The hydration system of claim 14, wherein the nozzle support frame comprises:

an upper mounting structure that is mechanically coupled to the gardening appliance and does not rotate with the grow tower; and a lower support structure for receiving the lower nozzle, wherein the plurality of support arms extend between and mechanically couple the upper mounting structure and the lower support structure.

18. The hydration system of claim 14, wherein both the upper nozzle and the lower nozzle are mounted along a central axis of the grow tower.

19. A hydration system for a gardening appliance, the gardening appliance comprising a turntable rotatably mounted within a cabinet and supporting a grow tower defining a root chamber, the hydration system comprising:

a nozzle support frame mounted at a top of the root chamber, the nozzle support frame comprising a plurality of support arms, at least one of the plurality of support arms being off-axis relative to a central axis of the grow tower, wherein each of the plurality of support arms are angled relative to the central axis such that the nozzle support frame forms a conical shape;

an upper nozzle mounted to the nozzle support frame proximate a top of the root chamber;

a lower nozzle mounted to the nozzle support frame proximate a bottom of the root chamber, wherein the conical shape of the nozzle support frame tapers toward the lower nozzle; and a water supply for supplying a flow of fluid to at least one of the upper nozzle or the lower nozzle.

20. The hydration system of claim 19, wherein at least two of the plurality of support arms are off-axis relative to the central axis.

* * * * *